US008788727B1

(12) United States Patent
Bordow

(10) Patent No.: US 8,788,727 B1
(45) Date of Patent: Jul. 22, 2014

(54) ELECTRONIC SYSTEM SUBJECT TO MEMORY OVERFLOW CONDITION

(71) Applicant: Agilent Technologies, Inc., Loveland, CO (US)

(72) Inventor: Robin A. Bordow, Petaluma, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 7 days.

(21) Appl. No.: 13/738,251

(22) Filed: Jan. 10, 2013

(51) Int. Cl.
*G06F 3/00* (2006.01)
*G06F 12/00* (2006.01)

(52) U.S. Cl.
USPC .............................. 710/33; 710/36

(58) Field of Classification Search
CPC .................................. G06F 3/00; G06F 12/00
USPC ...................... 710/33–36; 711/156
See application file for complete search history.

(56) References Cited

U.S. PATENT DOCUMENTS

| | | | |
|---|---|---|---|
| 3,982,101 A | | 9/1976 | Kalb et al. |
| 4,250,548 A | * | 2/1981 | Kindell ......................... 712/300 |
| 5,995,750 A | * | 11/1999 | Samson et al. ................ 718/107 |
| 6,549,992 B1 | * | 4/2003 | Armangau et al. ........... 711/162 |
| 6,892,287 B1 | * | 5/2005 | Millard et al. ................ 711/158 |
| 7,546,423 B2 | * | 6/2009 | Underbrink et al. ......... 711/147 |
| 2003/0035371 A1 | * | 2/2003 | Reed et al. .................... 370/230 |
| 2011/0202716 A1 | * | 8/2011 | Nakagawa .................... 711/113 |
| 2011/0243192 A1 | | 10/2011 | Tsakonas et al. |
| 2014/0052951 A1 | * | 2/2014 | Kulmala et al. .............. 711/165 |

FOREIGN PATENT DOCUMENTS

CN         101813497 B         8/2010

OTHER PUBLICATIONS

"FFT Cores for FPGA", RF Engines Ltd (RFEL), Version 1.1, URL: http://www.rfel.com/Files/Documents/D04026_FFT_Product_Sheet.pdf.
Tsai, et al. "FPGA-Based Reconfigurable Measurement Instruments with Functionality Defined by User", EURASIP Journal on Applied Signal Processing, vol. 2006, Article ID 84340, pp. 1-14.

* cited by examiner

*Primary Examiner* — Christopher Shin

(57) ABSTRACT

A method of operating an electronic system comprises storing information corresponding to an input data stream in a first memory having a first operating rate, detecting an overflow condition of the first memory, generating overflow information in response to the detection of the overflow condition, storing the overflow information in a second memory having a second operating rate slower than the first operating rate, transferring the overflow information from the detector to a third memory at a first transfer rate corresponding to the first operating rate, temporarily storing the overflow information in the third memory, and transferring the stored overflow information to the second memory at a second transfer rate corresponding to the second operating rate, and combining the information stored in the first memory with the overflow information stored in the second memory to produce an output data stream.

20 Claims, 8 Drawing Sheets

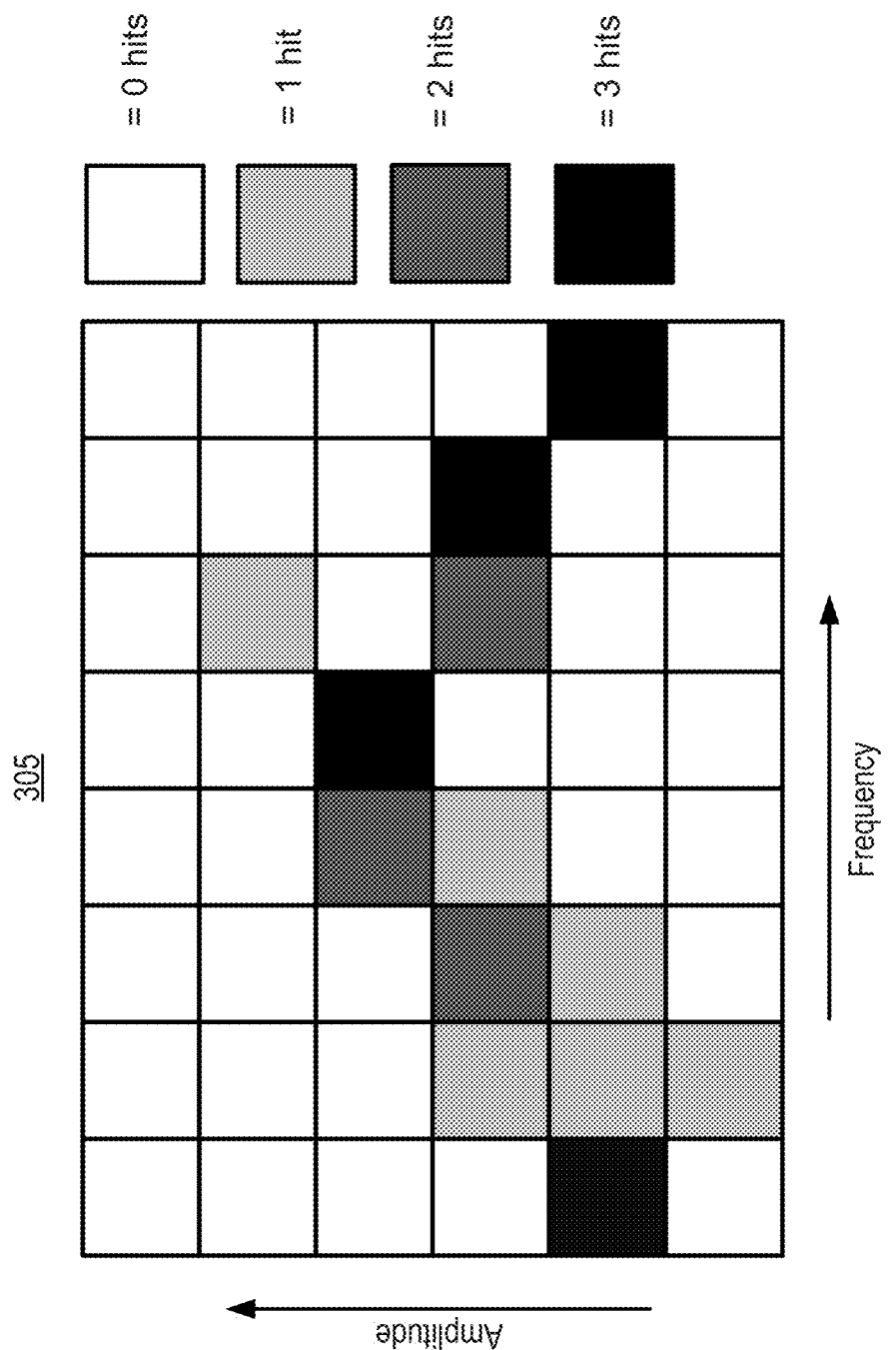

ELECTRONIC SYSTEM SUBJECT TO MEMORY OVERFLOW CONDITION

BACKGROUND

An electronic system generally requires a level of memory performance suited to the functions it performs. For example, a system may require relatively fast memory performance to manage data from a real-time data stream, or it may tolerate slower memory performance to store data long term data.

An example of a system that may require fast memory performance is a real-time spectrum analyzer (RTSA). A typical RTSA receives an input signal and converts it into a frequency spectrum at a relatively high rate, e.g., $300 \times 10^3$ spectra per second. These spectra are stored as histogram data representing the number of times each frequency of interest appears at a particular amplitude during a designated time interval. The stored histogram data is then presented on a display at a regular interval (e.g., 30 frames per second), allowing a user to observe the frequency content of the input signal in real-time.

To update the stored histogram data, the RTSA must read the data from the memory, modify the data according to a current spectrum provided in the input signal, and then rewrite the data in the memory. Such an operation is referred to as a read-modify-write operation. At a rate of $300 \times 10^3$ spectra per second, if each spectrum comprises 1024 samples, the RTSA may be required to perform approximately $300 \times 10^6$ read-modify-write operations per second. Accordingly, the memory used to store the histogram data—referred to as a histogram memory—must be relatively fast. In addition, to support a large range for each histogram entry, the histogram memory must have a relatively high capacity in order to avoid data overflow.

A standard approach to implementing a fast large histogram memory is to use a field programmable gate array (FPGA) BlockRAM. A typical FPGA BlockRAM can support read-modify-write operations at a rate required by an RTSA operating with a bandwidth of 255 MHz. Unfortunately, however, an FPGA with sufficient BlockRAM and speed for an RTSA is very expensive and would not normally be considered for use as part of a non-real-time spectrum analyzer. Consequently, most RTSA products are implemented as separate, more expensive instruments from non-real-time spectrum analyzers.

In view of the above and other shortcomings of conventional systems, there is a general need for techniques and technologies that can provide fast memory performance without requiring large amounts of expensive memory.

SUMMARY

In a representative embodiment, a system comprises a first memory configured to store information corresponding to an input data stream, wherein the first memory has a first operating rate, a detector configured to detect an overflow condition of the first memory and to generate overflow information in response to the detection of the overflow condition, a second memory configured to store the overflow information, wherein the second memory has a second operating rate slower than the first operating rate, a third memory configured to receive the overflow information from the detector at a first transfer rate corresponding to the first operating rate, to temporarily store the overflow information, and to transfer the stored overflow information to the second memory at a second transfer rate corresponding to the second operating rate, and a combiner configured to combine the information stored in the first memory with the overflow information stored in the second memory to produce an output data stream.

In another representative embodiment, a method comprises storing information corresponding to an input data stream in a first memory having a first operating rate, detecting an overflow condition of the first memory, generating overflow information in response to the detection of the overflow condition, storing the overflow information in a second memory having a second operating rate slower than the first operating rate, transferring the overflow information from the detector to a third memory at a first transfer rate corresponding to the first operating rate, temporarily storing the overflow information in the third memory, and transferring the stored overflow information to the second memory at a second transfer rate corresponding to the second operating rate, and combining the information stored in the first memory with the overflow information stored in the second memory to produce an output data stream.

BRIEF DESCRIPTION OF THE DRAWINGS

The described embodiments are best understood from the following detailed description when read with the accompanying drawing figures. Wherever applicable and practical, like reference numerals refer to like elements.

FIGS. 4A through 4C are two-dimensional (2D) pixel map diagrams illustrating the display of histogram data in the measurement instrument of FIG. 3 according to a representative embodiment.

DETAILED DESCRIPTION

Figure 1:
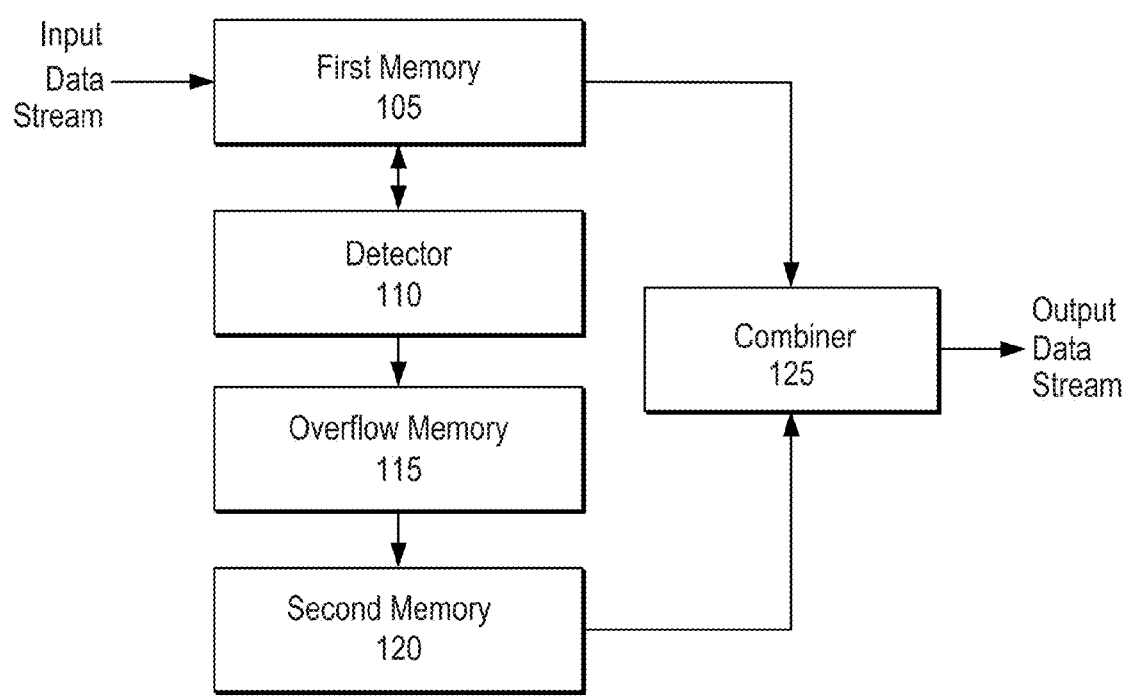
FIG. 1 is a block diagram of a system configured to perform data management in the presence of a memory overflow condition according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices.

The described embodiments relate generally to electronic systems comprising multiple memory devices that function in combination with each other to process memory requests at a relatively high rate. In certain embodiments, for example, an electronic system comprises a first memory configured to perform read-modify-write operations at a relatively high rate based on an input data stream, an overflow detector configured to detect an overflow condition of the first memory, a second memory configured to provide additional storage to compensate for the overflow condition of the first memory, and a third memory connected between the first and second memories and configured to temporarily store information to be stored in the second memory based on overflow data from the first memory. The third memory is used to compensate for a difference in operating speeds of the first and second memories. In particular, it prevents the second memory from being overwhelmed by the first memory generating overflow data at a relatively high rate. Even where the operating speed of the second memory is not insufficient to handle the average rate of overflow conditions, the instantaneous rate of overflows may temporarily exceed the operating speed of the second memory, thus necessitating the third memory. In certain embodiments, the third memory processes the overflow data through a first-in-first-out (FIFO) data structure.

Certain embodiments are described below in the context of an RTSA, although the embodiments are not generally limited to an RTSA. In an example RTSA, the first memory comprises an FPGA BlockRAM of limited storage capacity, and the second memory comprises a synchronous dynamic random access memory (SDRAM) or a synchronous static random access memory (SSRAM).

During typical operation, the RTSA receives and processes an input signal to generate an input data stream comprising several frequency spectra per second. For example, the RTSA may generate about $300 \times 10^3$ frequency spectra per second, where each spectrum comprises about 1024 values—a curve representing the frequency spectrum of a portion of the input signal. Accordingly, the input data stream may be generated with about $300 \times 10^6$ spectrum components per second.

The RTSA controls the BlockRAM to store histogram data that is updated according to the input data stream. The histogram data represents an accumulated frequency spectrum of the input signal. More specifically, it represents a superimposition of multiple frequency spectra of the input signal that have occurred over a designated time.

The histogram data is typically organized to correspond to a 2D pixel map to be displayed on the RTSA. In the pixel map, a horizontal axis represents frequency and a vertical axis represents amplitude. Accordingly, each location in the pixel map represents a particular frequency at a particular amplitude. An entry in the pixel map typically takes the form of a bit value indicating the number of times that the corresponding frequency/amplitude pair has occurred in the input data stream during a designated interval. For instance, an entry for a location $(f_x, A_y)$ may be a five bit word, where "00000" indicates that the input data stream has had zero frequency spectra with a data point at frequency $f_x$ and amplitude $A_y$, "1111" indicates that the input data stream has had thirty one frequency spectra with a data point at frequency $f_x$ and amplitude $A_y$, and so on. In other words, the entry may be a data value indicating a number of "hits" with respect to a particular frequency/amplitude pair.

Each time the RTSA detects that a current frequency spectrum includes a particular frequency/amplitude pair $(f_x, A_y)$, i.e., a frequency $f_x$ at amplitude $A_y$, it reads a corresponding entry (e.g., the five bit word) of the histogram data from the BlockRAM, increments the entry, and writes it back to the BlockRAM. In other words, the RTSA performs a read-modify-write operation to reflect an additional occurrence of the frequency amplitude pair.

Once the histogram data has been updated to reflect all of the entries in a current frequency spectrum, the overall 2D pixel map is displayed on a screen. To facilitate data analysis, the pixel map may be color coded to reflect the number of hits at each location. For instance, pixels having higher numbers of hits may be displayed in red, pixels having lower numbers of hits may be displayed in blue, and so on. In a typical implementation, the screen may be updated at a rate of about 30 times per second, so each screen update may represent an aggregate of about 10,000 spectrums that have all been superimposed on each other and color coded in density.

Under some circumstances, the BlockRAM may experience an overflow condition due to the rapid accumulation of histogram data. For example, suppose the histogram data comprises entries of five bits each as described above. Under these conditions, if the input data stream includes the same frequency spectrum in 31 accumulated iterations, then entries corresponding to that frequency spectrum will have the value "11111". Thereafter, if the same frequency spectrum is received again, these entries will be incremented from "11111" to "00000" and/or an error may be generated. In other words, the entries will overflow.

To avoid losing data in the event of such an overflow condition, the RTSA may use an overflow detector to detect that the overflow condition is about to occur. This detection can be performed in the course of a read-modify-write operation, for instance, by determining whether the read value for a particular five-bit entry is equal to "11111". Then, before incrementing the value, certain steps can be performed to compensate for the overflow condition.

Typically, compensation for the overflow condition comprises storing supplemental and/or redundant data (e.g., a supplemental 2D pixel map) in the SDRAM or SSRAM to indicate the number of times that the overflow condition has occurred for each entry in the histogram data. For instance, a supplemental 2D pixel map may store the value "00001" at a particular location to indicate that the corresponding entry in the BlockRAM has overflowed one time. Then, when the 2D pixel map is to be displayed on the screen of the RTSA, data in both the BlockRAM and the SDRAM or SSRAM can be combined to produce data to be displayed on the screen. For instance, assuming the BlockRAM and SDRAM store respective values of "00111" (7) and "00001" (1× overflow, or 1×31) for a particular location of the 2D pixel map, the values may be combined to produce a value of 7+31=38 to be displayed on the screen in some form such as color coding.

Because the BlockRAM and the SDRAM or SSDRAM have different operating rates, it may be necessary to include an overflow memory between them to temporarily buffer overflow data to be stored in the SDRAM or SSDRAM. For instance, assuming that 1024 entries of the BlockRAM overflow due to a current frequency spectrum, overflow data for the 1024 entries may be stored in the overflow memory at a relatively fast rate compatible with BlockRAM operation, and then the overflow data may then be transferred from the overflow memory to the SDRAM or SSRAM at a relatively slow rate compatible with SDRAM or SSRAM. In certain embodiments, the average rate of overflow data must be less than or equal to the operating rate of the second memory. However, the instantaneous rate of overflow data may exceed the operating rate of the second memory if the third memory temporarily stores the excess data.

By providing a relatively slow second memory such as an SDRAM or SSRAM to compensate for the overflow of a relatively fast first memory such as a BlockRAM, the described embodiments can effectively limit the amount of fast, expensive memory required to implement the RTSA. This can reduce the overall cost of the RTSA, and it can also make it possible to implement RTSA functionality in hardware used currently for non-real-time spectrum analyzers.

FIG. 1 is a block diagram of a system 100 configured to perform data management in the presence of a memory overflow condition according to a representative embodiment. This system can be viewed in certain aspects as a more generalized system compared to the RTSA system described above.

Referring to FIG. 1, system 100 comprises a first memory 105, a detector 110, an overflow memory 115 (or third memory), a second memory 120, and a combiner 125. Collectively, these components are configured to convert an input data stream, such as a sequence of frequency spectra, into an output data stream, such as display data. Although not shown in FIG. 1, these components are typically operated in response to a controller. For instance, the controller may transmit read/write requests to the memory components based on the input data stream. The controller may also modify data as part of read-modify-write operations.

During typical operation, first memory 105 stores information based on the input data stream. The stored information may include, for instance, histogram data generated by performing read-modify-write operations on first memory 105 according to data elements in the input data stream. First memory 105 may be a relatively fast memory compared to second memory 120. For example, it may be a BlockRAM of an FPGA or a fast SRAM. In addition, first memory 105 may have relatively low storage capacity compared to second memory 120. Accordingly, first memory 105 may be subject to an overflow condition.

Detector 110 is configured to detect the overflow condition of first memory 105 and to control operations to compensate for the overflow condition. For example, during a read-modify-write operation to update the histogram data, detector 110 may determine whether the modification will produce the overflow condition at a particular memory location. If so, detector 110 may temporarily store data in overflow memory 115 to indicate the overflow condition. This information may then be transferred from overflow memory 115 to second memory 120 for longer term storage.

Overflow memory 115 typically comprises a relatively fast memory so it can compensate for a difference in the rate of detection of overflows by detector 110 and the throughput of second memory 120. For example, overflow memory 115 may comprise a BlockRAM or a fast SRAM. Overflow memory 115 is typically implemented as a FIFO data structure to transfer overflow data from first memory 105 to second memory 120 according to the order in which the overflow occurs.

Combiner 125 combines the information stored in first memory 105 with corresponding overflow data stored in second memory 120, and it outputs the combined information as the output data stream. The output data stream is typically provided to a display apparatus, such as a screen on a spectrum analyzer. The combiner combines the information once per screen update, typically a much lower rate than spectra are generated (e.g., 30 msec vs. 3 usec).

By operating first memory 105 and second memory 120 in combination as shown in FIG. 1, system 100 may be used to implement a histogram memory of relatively high performance and capacity at a lower cost than a histogram memory formed of a single fast memory. For example, system 100 may be used to implement a fast histogram memory with 871×225 locations, with 16 or 32 bits at each location using an FPGA that only had enough BlockRAM to support 5 bits at each location.

Figure 2:
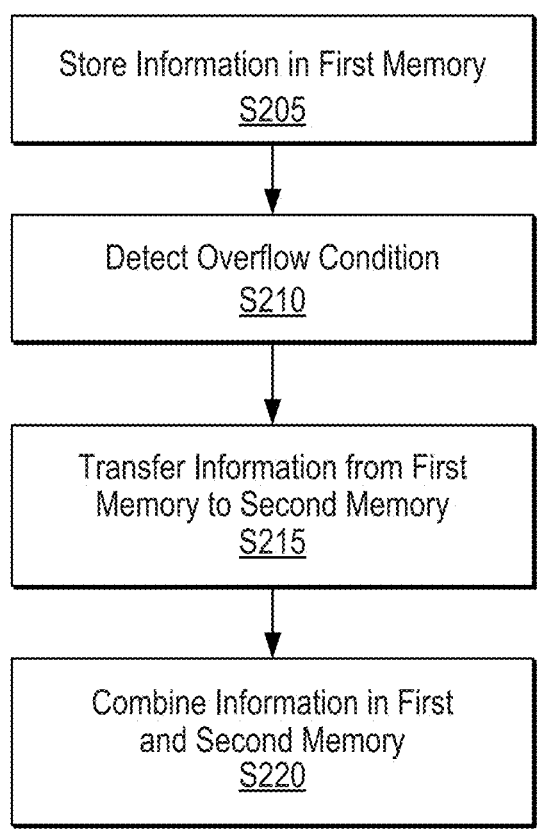
FIG. 2 is a flowchart illustrating a method of performing data management in the presence of a memory overflow condition according to a representative embodiment.

FIG. 2 is a flowchart illustrating a method 200 of performing data management in the presence of a memory overflow condition according to a representative embodiment. For explanation purposes, it will be assumed that method 200 is performed by system 100 of FIG. 1, although it is not necessarily limited to this particular system. In the description that follows, example method features are indicated by parentheses to distinguish them from example system features.

Referring to FIG. 2, the method begins by storing information corresponding to an input data stream in first memory 105 (S205). As indicated above, the stored information may be histogram data, which can be updated using read-modify-write operations. In addition, certain other operations in the method of FIG. 2 may be performed during such read-modify-write operations. For example, during the course of a read-modify-write operation, an overflow condition may be detected before the data is modified and rewritten. Moreover, as a general consideration, the operations illustrated in FIG. 2 and other flowcharts are not necessarily limited to the depicted order.

The method further comprises detecting an overflow condition of first memory 105 (S210) and transferring information from first memory 105 to second memory 120 via overflow memory 115 (S215). These operations can be performed by operating detector 110 as described above, and the use of overflow memory 115 can be used to compensate for a difference in rates between overflow detection performed by detector 110 and the throughput of second memory 120. Finally, the method further comprises combining information stored in first memory 105 and second memory 120 to produce an output data stream (S220).

Figure 3:
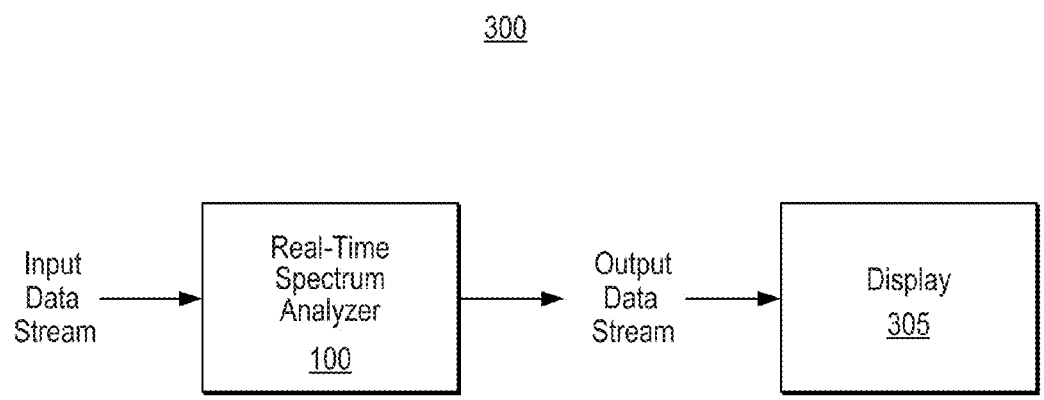
FIG. 3 is a block diagram of a measurement instrument incorporating the system of FIG. 1 according to a representative embodiment.

FIG. 3 is a block diagram of a measurement instrument 300 incorporating system 100 of FIG. 1 according to a representative embodiment. This diagram is presented as an example context for system 100.

Referring to FIG. 3, measurement instrument 300 comprises system 100 of FIG. 1 in the form of a RTSA, and a display 305. System 100 processes an input data stream as described above in relation to FIGS. 1 and 2, and it transmits a resulting output data stream to display 305. Although not shown in FIG. 3, measurement instrument 300 may further comprise other features for generating the input data stream, such as a signal probe to detect an input signal, a digitizer to convert the input signal into a stream of digital data, a signal processor to convert the digital data into frequency spectra, and so on. In addition, some of these additional features, such as the signal processor can be implemented together with digital logic used to perform various functions of system 100.

Figure 4A:
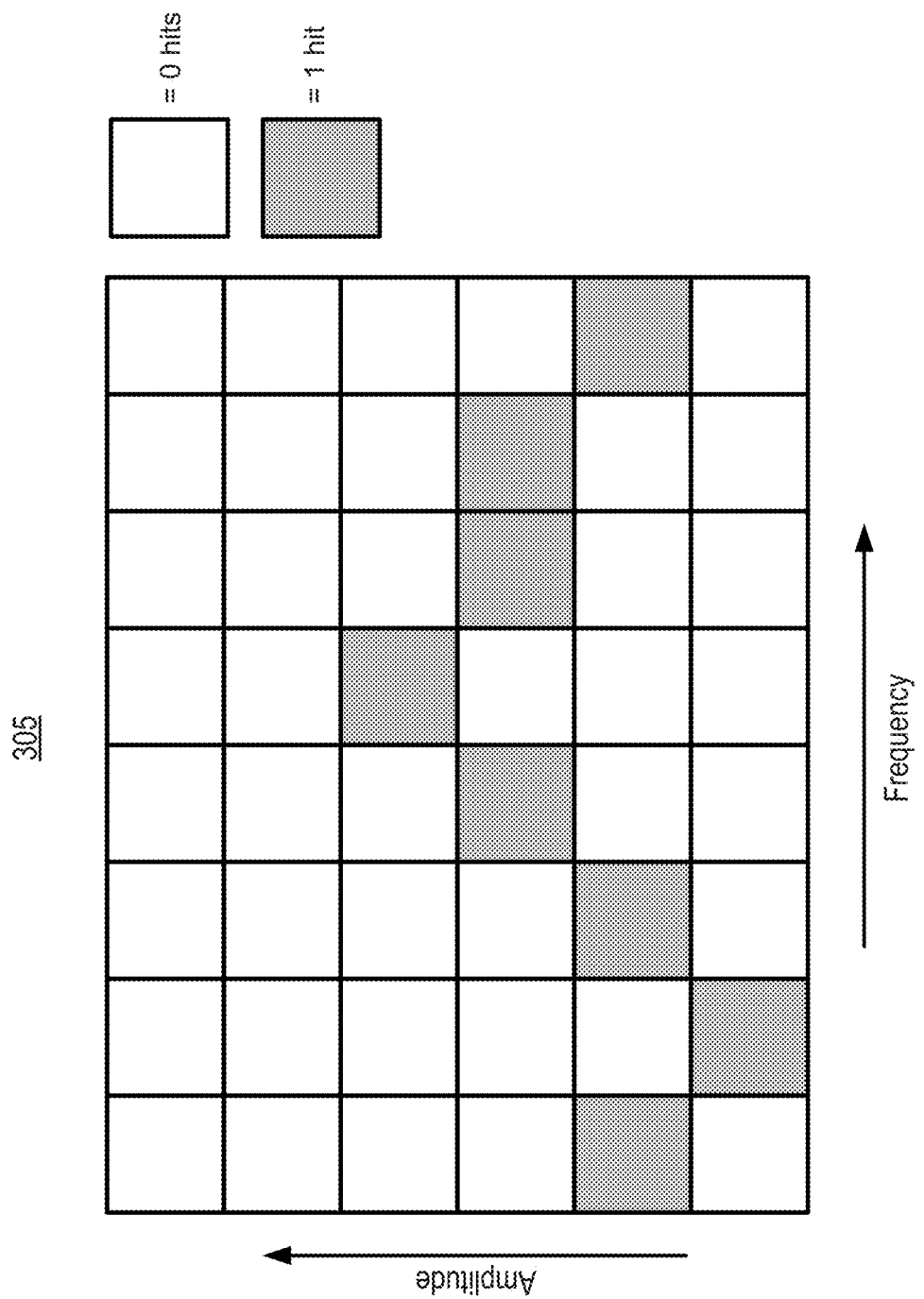
Figure 4B:
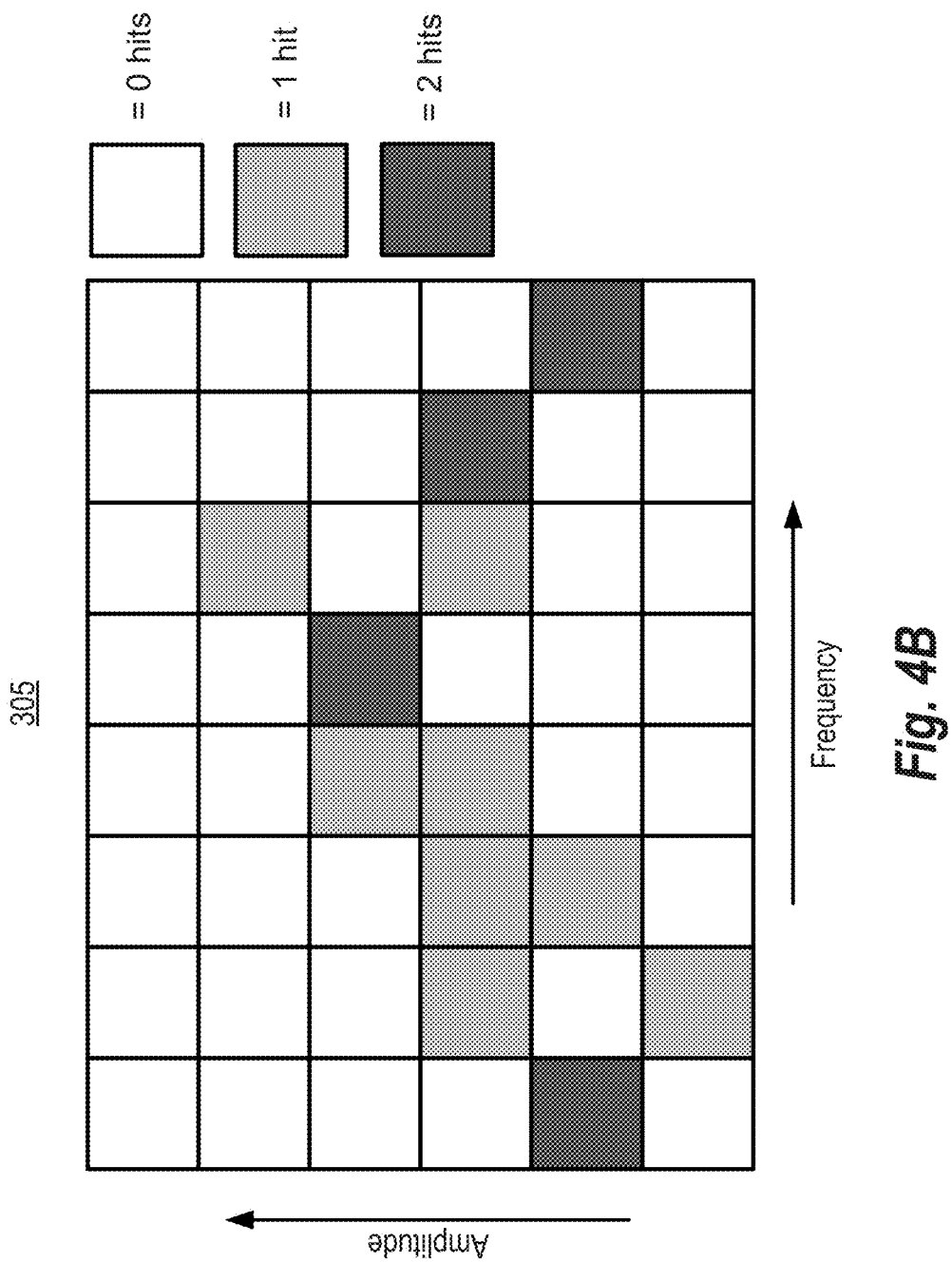

FIGS. 4A through 4C are 2D pixel map diagrams illustrating the display of histogram data in measurement instrument 300 according to a representative embodiment. In particular, FIG. 4A is a 2D pixel map diagram illustrating display 305 after a single frequency spectrum has been stored in first memory 105, FIG. 4B is a 2D pixel map diagram illustrating display 305 after two frequency spectra have been stored in first memory 105, and FIG. 4C is a 2D pixel map diagram illustrating display 305 after three frequency spectra have been stored in first memory 105. In each of FIGS. 4A through 4C, frequency is represented on the x-axis and amplitude is represented on the y-axis. Accordingly, each pixel location (x, y) corresponds to a single frequency/amplitude combination or pair ($f_x$, $A_y$).

The diagrams in FIGS. 4A through 4C are presented as teaching examples and they represent simplified versions of what may be displayed in a practical implementation. For example, in practice, several new frequency spectra may be combined to create each new image to be presented on display 305, rather than a single frequency spectrum. As an additional simplification, it will be assumed that each entry of the pixel map is stored as a two bit value (e.g., "00", "01", "10", or "11") in first memory 105. Accordingly, an overflow condition will occur in first memory 105 if an entry has four hits within a predetermined time interval.

Referring to FIG. 4A, after system 100 has received a single frequency spectrum, first memory 105 stores histogram data corresponding to the illustrated pixel map. The histogram data is stored by reading values of histogram data in first memory 105 that correspond to the components of the frequency spectrum, incrementing the read values, and then rewriting them in first memory 105 to replace previously stored versions of the read values. The histogram data is initially set to zero, so for pixels illustrated as shaded boxes in FIG. 4A, labeled "1 hit", the updated histogram data comprises the value "01" to indicate that the corresponding frequency/amplitude combination has been present in one frequency spectrum. For pixels illustrated without shading, labeled "0 hits", the histogram data comprises the value "00" to indicate that the corresponding frequency/amplitude combination has been present in zero frequency spectra. After the histogram data has been stored in first memory 105, it is then presented on display 305 as shown in the diagram.

Referring to FIG. 4B, after system 100 has received two frequency spectra, first memory 105 stores histogram data corresponding to the illustrated pixel map. The histogram data is stored by reading values of the histogram data in first memory 105 that correspond to the newest frequency spectrum, incrementing the read values, and then rewriting them in first memory 105 to replace previously stored versions of the read values. For pixels illustrated with shaded boxes of a first shading amount labeled "1 hit", the updated histogram data comprises the value "01" to indicate that the corresponding frequency/amplitude combination has been present in one frequency spectrum. For pixels illustrated with shaded boxes of a second shading amount labeled "2 hits", the updated histogram data comprises the value "10" to indicate that the corresponding frequency/amplitude combination has been present in two frequency spectra. For pixels illustrated without shading, the histogram data comprises the value "00" to indicate that the corresponding frequency/amplitude combination has been present in zero frequency spectra. After the updated histogram data has been stored in first memory 105, it is then presented on display 305 as shown in the diagram.

Referring to FIG. 4C, after system 100 has received three frequency spectra, first memory 105 stores histogram data corresponding to the illustrated pixel map. As in the example of FIG. 4B, the histogram data is stored by performing a read-modify-write operation on the histogram data stored in first memory 105. For pixels illustrated with shaded boxes of a first shading amount labeled "1 hit", the updated histogram data comprises the value "01" to indicate that the corresponding frequency/amplitude combination has been present in one frequency spectrum. For pixels illustrated with shaded boxes of a second shading amount labeled "2 hits", the updated histogram data comprises the value "10" to indicate that the corresponding frequency/amplitude combination has been present in two frequency spectra. For pixels illustrated with shaded boxes of a third shading amount labeled "3 hits", the histogram data comprises the value "11" to indicate that the corresponding frequency/amplitude combination has been present in three frequency spectra. For pixels illustrated without shading, the histogram data comprises the value "00" to indicate that the corresponding frequency/amplitude combination has been present in zero frequency spectra. After the updated histogram data has been stored in first memory 105, it is then presented on display 305 as shown in the diagram.

Because first memory 105 stores the value "11" for some of the pixels shown in FIG. 4C, it may experience overflow if a subsequent frequency spectrum produces hits for the corresponding frequency/amplitude pairs. In the event of such an overflow, detector 110 will detect the value "11" during the read portion of a read-modify-write operation, and it will store an indication of the overflow in overflow memory 115. Then, the value "11" will be incremented, essentially resetting it to "00", and then rewritten in first memory 105. At some point typically determined by the operating rate and pending operations of second memory 120, overflow memory 115 will update second memory 120 to indicate that the overflow event has occurred at a corresponding location in first memory 105. Thereafter, the pixel values shown on display 305 may be determined by combining the data stored in first memory 105 and second memory 120 within combiner 125. In addition, although the above description indicates that the data values in first memory 105 are presented on display 305 prior to any data overflow, the pixel values in FIGS. 4A through 4C may nevertheless be generated by combining the values in first memory 105 with corresponding values stored in second memory 120, which will typically be set to zero initially so as to have no effect before an overflow event occurs.

Although the histogram data illustrated in FIGS. 4A through 4C is distinguished by shading, there are other ways to visually distinguish different values in this type of display. For instance, they may be distinguished by using a color coding scheme or some other technique.

Figure 5:
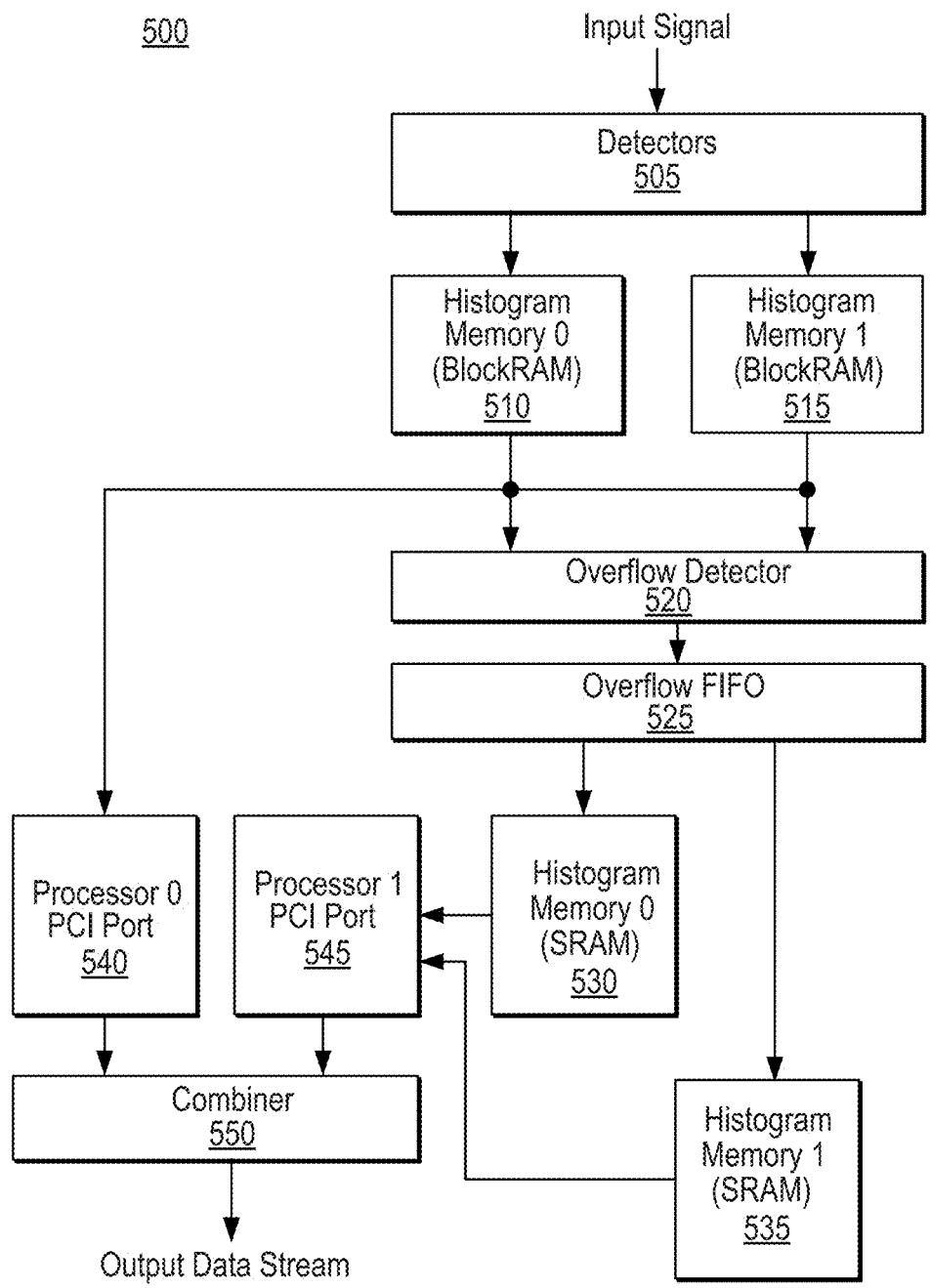
FIG. 5 is a block diagram of a system configured to perform data management in the presence of a memory overflow condition according to another representative embodiment.

FIG. 5 is a block diagram of a system 500 configured to perform data management in the presence of a memory overflow condition according to another representative embodiment.

Referring to FIG. 5, system 500 comprises a detector 505, first and second histogram memories 510 and 515, an overflow detector 520, an overflow memory 525, third and fourth histogram memories 530 and 535, first and second processors 540 and 545, and a combiner 550.

Detector 505 is configured to sample an input signal to produce an input data stream comprising a sequence of frequency spectra. Detector 505 directs the input data stream alternately to first and second histogram memories 510 and 515, switching each time the display is updated.

First and second histogram memories 510 and 515 alternately receive the input data stream and alternately maintain histogram data for a 2D pixel map according to the input data stream. While first histogram memory 510 receives the input data stream and maintains the histogram, second histogram memory 515 has its contents transferred to a PCI Port of first processor 540 and then to combiner 550 to provide a display update. While second histogram memory 515 receives the input data stream, first histogram memory 510 has its contents transferred. This prevents data from being lost from the input stream while histogram memory is being transferred to the display. The act of transferring the data also clears the histogram memory being transferred so that it is empty when it begins accepting the input data stream again. In this example, the histogram data is managed among two separate units of BlockRAM, although the number of units can be varied arbitrarily. In general, the combination of first and second histogram memories 510 and 515 can be viewed as an example of first memory 105 of FIG. 1. Accordingly, the histogram data can be managed using a controller similar to that described in relation to first memory 105, and the histogram data can be updated to reflect the received frequency spectra using read-modify-write operations as described above in relation to first memory 105. The histogram data may be stored as five-bit values, for instance, so they can have 32 different values ranging from "00000" to "11111".

Overflow detector 520 detects and responds to an overflow condition of first or second histogram memories 510 and 515. For instance, it can detect whether a particular location of these memories is to be incremented from "11111" to "00000" based on the input data stream. Upon detecting the overflow condition, overflow detector 520 controls overflow memory 525 to store overflow data indicating the overflow condition.

Overflow memory 525 comprises a relatively fast memory such as a BlockRAM, and it temporarily stores overflow data indicating overflow conditions of first and second histogram memories 510 and 515. The overflow data is temporarily stored in a FIFO data structure from which it is alternately transferred to third and fourth histogram memories 530 and 535 according to the relatively slower operating speed of these other memories. Where the input data stream goes to first histogram memory 510, the overflow data goes to third histogram memory 530. While this is happening, data from second histogram memory 515 and fourth histogram memory 535 is transferred to first and second processors 540 and 545 respectively. Once the display has been updated from the combiner, the controller swaps the flows into and out of the histogram memories so that the input data stream goes to second histogram memory 515, the overflow data goes to fourth histogram memory 535 while first histogram memory 510 and third histogram memory 530 are being transferred to first and second processors 540 and 545 respectively.

The FIFO is used to compensate for the difference in rate between the first and second histogram memories 510 and 515 and the third and fourth histogram memories 530 and 535. In other words, because overflow data may potentially be generated at a high rate corresponding to the operating speed of BlockRAMs, the FIFO may temporarily store and output the overflow data at a slower rate in FIFO order to the third and fourth histogram memories 530 and 535, which may be SDRAMs, for instance.

In general, it may be difficult to determine the required operating characteristics of the FIFO to compensate for the rate difference because the amount of overflow data depends on the content of the input signal. For example, if the input signal results in the same frequency spectrum in each interval of interest, then after 32 spectrums, all of the corresponding locations in first or second histogram memories 510 and 515 will overflow at the same time. Consequently, the FIFO should generally be large enough to handle all traffic without overwhelming the SDRAM. On the other hand, if a more random signal is mapped to the histogram data, then overflows may not occur for a relatively long time. Nevertheless, once overflows start to occur, their aggregate may be relatively larger for each frequency spectrum. Consequently, if the FIFO in overflow memory 525 is not large enough, it can potentially swell and then overflow in large burst, losing requests from overflow detector 520 on account of the limited speed of the SDRAM.

First processor 540 alternately receives and outputs the histogram data stored in first and second histogram memories 510 and 515, and second processor 545 alternately receives and outputs the histogram data stored in third and fourth histogram memories 530 and 535. This data is typically provided in the form of 2D pixel map data to be shown on a display device.

Combiner 550 receives the data output by first and second processors 540 and 545, and it combines the data to produce an output data stream. The output data stream typically comprises a combined 2D pixel map to be shown on the display device.

Although not shown, in FIG. 5, various components of system 500 operate under the control of additional digital logic or control components. For example, the transfer of data between overflow memory 525 and the SRAMs may be controlled by an SRAM controller. In addition, in certain embodiments, the control functions of different components can be integrated into the same digital logic platform. For instance, digital logic components within a single FPGA could be used to implement control functions of overflow detector 520 and overflow memory 525, for instance.

Figure 6:
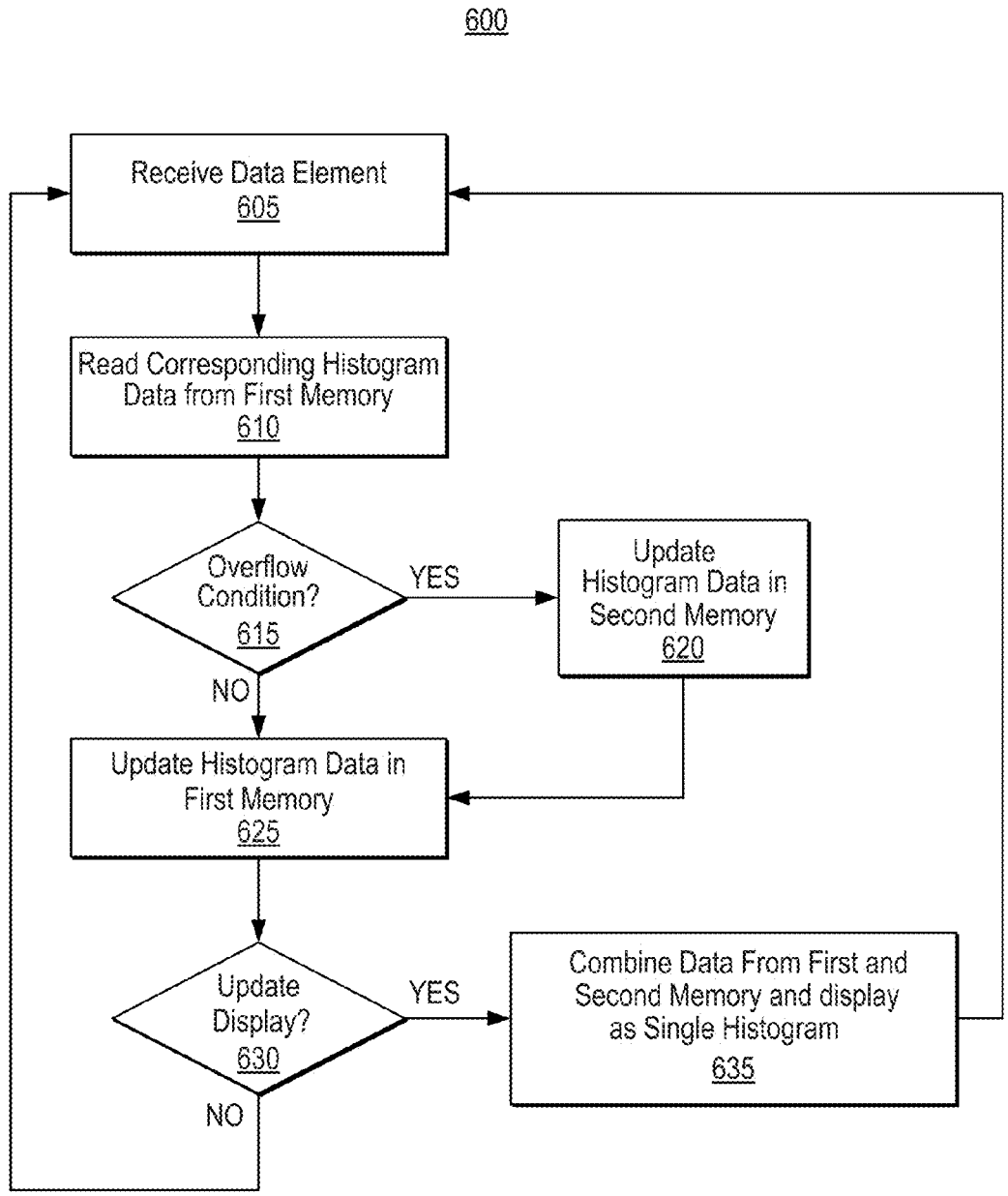
FIG. 6 is a flowchart illustrating a method of performing data management in the presence of a memory overflow condition according to another representative embodiment.

FIG. 6 is a flowchart illustrating a method 600 of performing data management in the presence of a memory overflow condition according to another representative embodiment. For explanation purposes, it will be assumed that the method of FIG. 6 is performed by system 500, although the method is not limited to this or any other particular system implementation.

Referring to FIG. 6, method 600 begins by receiving a data element of an input data stream (S605). The data element typically comprises a frequency/amplitude pair of a frequency spectrum, as described above in relation to other embodiments.

Next, the method reads histogram data corresponding to the received data element from a first memory, e.g., first or second histogram memory 510 or 515 (S610). The reading of histogram data is typically performed in response to a read-modify-write request generated by system 500. Then, based on the read histogram data, the method determines whether an overflow condition has occurred (S615). For example, if the read histogram data comprises a five bit word with the value "11111", the method may determine that the overflow condition has occurred, as described above in relation to other embodiments.

Where the overflow condition is detected (S615=YES), the method updates histogram data in a second memory, e.g., third or fourth histogram memory 530 or 535 (S620). For instance, it may increment a 2D pixel map entry in the second memory to indicate the occurrence of an additional overflow event. Thereafter, the histogram data in the first memory is updated according to the received data element (S625). For example, the value "11111" may be incremented to "00000". Where the overflow condition is not detected (S615=NO), the method proceeds to operation S625 without updating histogram data in the second memory.

After the histogram data is updated in the first and/or second memories, the method determines whether to update a display according to the updated data or whether to continue to receive and process further data elements (S630). This determination may be performed by some explicit determination process within each loop of method 600, or it can be performed implicitly. For instance, in some embodiments the display is updated after a predetermined number of frequency spectra have been processed. This typically occurs on a periodic basis, e.g., to satisfy a display refresh rate of about 30 frames per second, and the control of the periodic operations can be performed in a variety of ways, such as handling an interrupt signal, accessing a counter variable, etc.

Where the method determines to update the display (S630=YES), the histogram data from the first and second memories is combined and presented as a single histogram in the display, as described above in relation to other embodiments (S635). Then, the method returns to operation S605. Otherwise, where the method determines not to update the display (S630=NO), the method returns to operation S605 without performing operation S635.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system, comprising:
a first memory configured to store information corresponding to an input data stream, wherein the first memory has a first operating rate;
a detector configured to detect an overflow condition of the first memory and to generate overflow information in response to the detection of the overflow condition;
a second memory configured to store the overflow information, wherein the second memory has a second operating rate slower than the first operating rate;
a third memory configured to receive the overflow information from the detector at a first transfer rate corresponding to the first operating rate, to temporarily store the overflow information, and to transfer the stored overflow information to the second memory at a second transfer rate corresponding to the second operating rate; and
a combiner configured to combine the information stored in the first memory with the overflow information stored in the second memory to produce an output data stream.

2. The system of claim 1, wherein the input data stream comprises spectrum data of a real-time spectrum analyzer.

3. The system of claim 2, wherein the information comprises histogram data corresponding to the spectrum data.

4. The system of claim 1, wherein the output data stream comprises a two-dimensional pixel map to be shown on a real-time spectrum analyzer display.

5. The system of claim 1, wherein the third memory is configured to transfer the stored overflow information to the second memory in a first-in-first-out (FIFO) order.

6. The system of claim 1, wherein the first memory is a BlockRAM of a field programmable gate array.

7. The system of claim 6, wherein the third memory is a BlockRAM of the field programmable gate array.

8. The system of claim 1, wherein the second memory comprises a synchronous dynamic random access memory (SDRAM).

9. The system of claim 1, wherein the overflow condition occurs where a memory location of the first memory is determined to have insufficient capacity to store information corresponding to a data element of the input data stream.

10. The system of claim 1, wherein the first memory stores the information corresponding to the input data stream by performing read-modify-write operations on histogram data in a two-dimensional pixel map.

11. The system of claim 1, wherein the overflow information stored in the second memory indicates a number of times that the overflow condition has occurred with respect to units of the information stored in the first memory.

12. A method, comprising:
storing information corresponding to an input data stream in a first memory having a first operating rate;
detecting an overflow condition of the first memory;
generating overflow information in response to the detection of the overflow condition;
storing the overflow information in a second memory having a second operating rate slower than the first operating rate;
transferring the overflow information from the detector to a third memory at a first transfer rate corresponding to the first operating rate, temporarily storing the overflow information in the third memory, and transferring the stored overflow information to the second memory at a second transfer rate corresponding to the second operating rate; and
combining the information stored in the first memory with the overflow information stored in the second memory to produce an output data stream.

13. The method of claim 12, wherein the input data stream comprises spectrum data of a real-time spectrum analyzer.

14. The method of claim 13, wherein the information comprises histogram data corresponding to the spectrum data.

15. The method of claim 12, wherein the output data stream comprises a two-dimensional pixel map to be shown on a real-time spectrum analyzer display.

16. The method of claim 12, wherein the third memory is configured to transfer the stored overflow information to the second memory in a first-in-first-out (FIFO) order.

17. The method of claim 12, wherein the first memory is a BlockRAM of a field programmable gate array.

18. The method of claim 17, wherein the third memory is a BlockRAM of the field programmable gate array.

19. The method of claim 12, wherein the second memory comprises a synchronous dynamic random access memory (SDRAM).

20. The method of claim 12, wherein detecting the overflow condition comprises detecting that a memory location of the first memory has insufficient capacity to store information corresponding to a data element of the input data stream.

* * * * *